3,491,040
PROCESS FOR ISOLATING VINYL-TYPE COMPONENT OF STARCH GRAFT COPOLYMERS
Lewis A. Gugliemelli, Pekin, and M. Ollidene Weaver, Peoria, Ill., assignors to the United States of America as represented by the Secretary of Agriculture
No Drawing. Filed June 14, 1968, Ser. No. 736,966
Int. Cl. C08f 27/26
U.S. Cl. 260—17.4                    1 Claim

ABSTRACT OF THE DISCLOSURE

Isolating content of vinyl-type compounds in starch graft copolymers thereof are determined under conditions that do not alter sensitive functional groups by a process wherein the starch moiety is oxidized with periodate and the so produced dialdehyde starch moiety is then catalytically depolymerized at room temperature with sodium methoxide in anhydrous methanol. The liberated undepolymerized vinyl component is then readily and essentially quantitatively isolated for weighing and other analytical procedures.

---

A nonexclusive, irrevocable, royalty-free license is the invention herein described, throughout the world for all purposes of the United States Government, with the power to grant sublicenses for such purposes, is hereby granted to the Government of the United States of America.

BACKGROUND OF THE INVENTION

The preparation of graft copolymers of starch with unsaturated vinyl-type compounds such as acrylonitrile, methyl acrylate, and methyl methacrylate are described in the copending application of Reyes et al., Ser. No. 529,947 and also in applicants' U.S. Patent 3,377,302 wherein it is further shown that saponification of the starch vinyl-type copolymers provides products whose dilute aqueous solutions exhibit greatly increased viscosities that render the products highly useful as flocculents, sizing agents for paper and textiles, and as retention aids for paper coating pigments, and again in commonly assigned copending application Ser. No. 531,049, now Patent No. 3,425,971. Similar though nonsaponified starch graft copolymers also are taught in British Patent 869,501.

Because the specific properties of the various starch graft copolymers depend in large measure on the degree of grafting of the vinyl-type monomer and on the average length of the engrafted chains, it is especially important for commercial purposes to know the precise chemical nature of any particular batch of starch graft copolymer, just as the same knowledge is essential for the continued efforts to determine the optimal conditions for the grafting process.

Until the discoveries comprising the instant invention, the only methods for isolating the vinyl graft component of the copolymers involved either hydrolyzing the starch with (1) N HCl at reflux temperature for 4 to 6 hours, which treatment also alters susceptible functional groups of some vinyl polymers, or (2) with enzymes at 50° C. for 5 hours, which treatment does not always completely hydrolyze starch in highly grafted copolymers.

The object of the instant invention is the provision of an entirely dependable process for fully depolymerizing only the starch moiety of a vinyl-type graft copolymer of starch, whereby the unsaturated monomer component can be isolated and the D.S. of the intact copolymer determined.

In accordance with the stated object we have now provided a highly practical and efficient process comprising oxidizing the starch component of the graft copolymer in known manner with periodic acid or preferably with sodium periodate and then in anhydrous methyl alcohol solution containing sodium methoxide catalyst, depolymerizing exclusively the oxystarch moiety at room temperature to glyoxal and other water- and alcohol-soluble compounds, such as glyoxal 1-(2')-(2,4-dihydroxy-2-butenal)-1-(3')-(D-erythrose) acetal, from which the intact vinyl-type polymer portion of the original starch vinyl graft copolymer is quantitatively isolated by simple filtration followed by washing successively in methanol and water before determining its molecular weight thereof in DMF solution. Evidence that the vinyl-type moiety is not appreciably degraded by the foregoing treatment is provided by intrinsic viscosity measurements, e.g., polyacrylonitrile with an intrinsic viscosity of 11.5 in DMF at 25° C. exhibited the same viscosity as a sample that was subjected to the periodate oxidation and sodium methoxide treatments. Furthermore, carbon analyses of the vinyl-type residues are in excellent agreement with theoretical values, and their infrared spectra exhibit no absorption in the regions that would indicate the presence of a polysaccharide.

The preparation of ceric ammonium nitrate initiated starch graft copolymers with such vinyl-type monomers as acrylonitrile (AN), methyl acrylate (MA), and methyl methacrylate (MMA) forms no part of the present invention, but the following typical preparation is included as a convenience.

EXAMPLE 1

Thirty-six grams of starch with a moisture content of 9.8 percent was dispersed in 400 ml. water at 50° C. under nitrogen for 30 minutes and then cooled to 30° C. Grafting sites were created by reacting 12 ml. of 0.1 M ceric ammonium nitrate in 1 N HNO$_3$ therewith for 20 minutes. Then 68 grams of freshly distilled AN was added under N$_2$ and the reaction mixture was held at 30° C. for 3 hours. The filtered graft copolymer was washed with water and then extracted with 300 ml. DMF to remove the 1.8 grams of ungrafted AN homopolymer. The residual solvent was removed by washing with water. The yield of graft copolymer was 88 grams; based on a carbon analysis of 61.3 percent it contained 71.5 percent by weight of PAN.

Other AN starch graft copolymers were prepared using respectively 48 grams and 28 grams of AN, the respective yields being 52 grams and 43 grams, for which the carbon analyzed 56.2 percent and 52.5 percent, corresponding to PAN contents of 54.0 percent and 34.2 percent. A similar preparation using 64 grams of MA gave 90 grams of graft copolymer analyzing 52.2 percent carbon (67.5 percent PMA content), whereas with 50 ml. of ceric reagent and 75 grams of MMA, and a reaction temperature of 50° C., the yield of starch graft copolymer was 88 grams that analyzed 54.6 percent carbon, corresponding to a PMMA content of 65.5 percent.

A 3-gram aliquot of the 88 grams of AN-grafted starch was suspended in water, heated at 100° C. for 15 minutes and then cooled to 25° C. Then 15 ml. of a 20 percent solution of periodic acid was added, and the reaction mixture was stirred for 3 hours to form the corresponding dialdehyde starch graft copolymer, which was isolated by filtration, and then freed of inorganic ions by thoroughly washing with water followed by methanol to remove the water.

The so obtained dialdehyde starch PAN graft copolymer was stirred for 3 hours at 25° C. in a mixture consisting of 30 ml. methanol and 3 ml. of 1 N NaOCH$_3$ after which the freed PAN was recovered by filtration and washed in turn with methanol and then with water. The recovered PAN weighed 2.04 grams equivalent to a 95 percent recovery of the liberated PAN, which analyzed 67.3 percent C as compared with a theoretical expectation of 68.0 percent.

Similarly the second described starch-AN graft copolymer gave a 97 percent of expectation recovery of the 54.0 percent content of PAN, whereas respectively 93 percent and 94 percent of the 67.5 percent and 65.5 percent contents of PMA and PMMA were recovered following liberation from the indicated respective graft copolymers.

We believe that the process of the invention is applicable for isolating the vinyl-type component of graft copolymers of other polysaccharides such as, e.g., those of amylose, amylopectin, dextran, dextrin, and Xanthomonas polysaccharide.

We claim:
1. A process for substantially quantitatively isolating a vinyl-type homopolymer selected from the group consisting of polyacrylonitrile, polymethacrylic acid, and polymethylmethacrylic acid contained in a vinyl-type graft of starch with said homopolymers, said process comprising the steps of:
  (a) forming the corresponding dialdehyde starch analogue of said vinyl-type starch graft by treatment with sodium periodate or periodic acid;
  (b) slurrying the isolated so-produced dialdehyde starch analogue for several hours at 25° C. in a reaction mixture consisting of 1 part sodium methoxide catalyst and 30 parts absolute methanol whereby the dialdehyde starch moiety is selectively depolymerized and converted to soluble residues, leaving the thereby freed vinyl-type homopolymer substantially intact;
  (c) and filtering the solution to isolate the said homopolymer therefrom.

References Cited

UNITED STATES PATENTS 3,117,949   1/1964   Borchert _____ 260—73

OTHER REFERENCES

Huang et al.: Journal of Applied Polymer Science, 1968, 12, No. 11, 2549–2562.

HAROLD D. ANDERSON, Primary Examiner

R. J. KOCH, Assistant Examiner

U.S. Cl. X.R.

260—88.7, 89.5